United States Patent
Fournie et al.

(10) Patent No.: US 12,412,978 B2
(45) Date of Patent: Sep. 9, 2025

(54) METHOD FOR MANUFACTURING AN AIRCRAFT RADOME BY ASSEMBLING SMALL-SIZED PIECES OF SKIN, AIRCRAFT RADOME AND AIRCRAFT

(71) Applicant: Airbus Operations SAS, Toulouse (FR)

(72) Inventors: Jacques Fournie, Toulouse (FR); Christophe Bernus, Toulouse (FR); Olivier Verstraete, Toulouse (FR); Thomas Berhault, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 160 days.

(21) Appl. No.: 18/343,826

(22) Filed: Jun. 29, 2023

(65) Prior Publication Data
US 2024/0006753 A1 Jan. 4, 2024

(30) Foreign Application Priority Data
Jun. 30, 2022 (FR) ........................ 2206672

(51) Int. Cl.
*H01Q 1/42* (2006.01)
*B64F 5/10* (2017.01)
*H01Q 1/28* (2006.01)

(52) U.S. Cl.
CPC .............. *H01Q 1/422* (2013.01); *B64F 5/10* (2017.01); *H01Q 1/28* (2013.01)

(58) Field of Classification Search
CPC ............ H01Q 1/42; H01Q 1/422; H01Q 1/28; H01Q 1/281
See application file for complete search history.

(56) References Cited

U.S. PATENT DOCUMENTS

| 4,620,890 A | 11/1986 | Myers et al. |
| 5,344,685 A | 9/1994 | Cassell |

FOREIGN PATENT DOCUMENTS

| FR | 2431200 A1 | 2/1980 | |
| GB | 2133337 A | 7/1984 | |
| JP | 2008277885 A | * 11/2008 | ............... H01Q 1/42 |

OTHER PUBLICATIONS

French Search Report for corresponding French Patent Application No. 2206672 dated Jan. 31, 2023; priority document.

* cited by examiner

*Primary Examiner* — Hoang V Nguyen
(74) *Attorney, Agent, or Firm* — Greer, Burns & Crain, Ltd.

(57) ABSTRACT

A method of assembling an aircraft radome and a radome comprising at least a first skin and a second skin arranged on two opposite faces of the same shell, the first skin and the second skin being formed from a first assembly of skin pieces and from a second assembly of skin pieces, respectively, the assemblies being such that all or some of the skin pieces of the first and second assemblies partially overlap one or more neighboring skin pieces of the assembly that includes them, and such that the ratio between the surface area of a piece of skin overlapping one or more neighboring pieces of skin and the total surface area of that piece of skin does not exceed a predetermined threshold value.

17 Claims, 4 Drawing Sheets

METHOD FOR MANUFACTURING AN AIRCRAFT RADOME BY ASSEMBLING SMALL-SIZED PIECES OF SKIN, AIRCRAFT RADOME AND AIRCRAFT

CROSS-REFERENCES TO RELATED APPLICATIONS

This application claims the benefit of the French patent application No. 2206672 filed on Jun. 30, 2022, the entire disclosures of which are incorporated herein by way of reference.

BACKGROUND OF THE INVENTION

The present invention relates to aircraft radomes. More particularly, the invention relates to a method for manufacturing an aircraft radome, as well as an aircraft radome and an aircraft comprising a radome of this kind.

BACKGROUND OF THE INVENTION

Many aircraft, including civil and military transport planes, have a radome installed at the front of the fuselage, forming a dome or a tip. The function of a radome of this kind is to protect a radar device positioned at the front of the aircraft, while at the same time providing the aircraft with good aerodynamic performance. The fact that there is a radar beneath it means that the radome must be made of a material that is permeable to electromagnetic waves, for example an electrically insulating composite material.

Existing aircraft radomes are generally sandwich constructions which involve a rigid assembly being constructed comprising at least one shell, also known as a core, arranged between two skins. This allows the bending rigidity to be substantially increased while providing good transparency to electromagnetic waves, in particular by adjusting the thickness of the radome to the wavelength of the radar which is covered. The role of a core is to provide support for the assembled skins, so that the assembly can withstand bending stresses, with the core itself exhibiting shear resistance characteristics. The skins used for radomes are made of large petals assembled by hand. These petals are typically fabrics (e.g., quartz or glass fabrics) impregnated with an organic or synthetic resin. Some aircraft radomes have a double-sandwich construction, meaning they are made by stacking an outer skin, a first shell, a central skin, a second shell and finally an inner skin. Other radomes may exhibit an even more complex structure, such as a triple-sandwich, in which three shells are arranged in an alternating stack of skins and shells. In one manufacturing example, a first skin is assembled on a mold, then a shell is assembled on this first skin and a second skin is then assembled on the shell. The shape of radomes, exhibiting a pronounced double curvature, requires manual assembly and the size of the petals is limited by the deformability of the fabric sheets in respect of the shape of the support structure exhibiting this double curvature.

The situation therefore leaves room for improvement.

SUMMARY OF THE INVENTION

An object of the present invention is to provide a method for manufacturing an aircraft radome that is capable of being automated and allows the rate of manufacturing material waste to be reduced.

To this end, an aircraft radome is proposed which comprises at least one shell, a first skin and a second skin formed from a first assembly of skin pieces and a second assembly of skin pieces, respectively. The radome is configured such that:
- all or some of the skin pieces of the first and second assemblies partially overlap one or more neighboring skin pieces of the assembly that includes them, and
- the ratio between the surface area of a skin piece overlapping one or more neighboring skin pieces and the total surface area of that skin piece does not exceed a predetermined threshold value.

It is therefore advantageously possible to operate an automated assembly of skin pieces with a smaller uniform size which allows them to be positioned by an automated device, such as an industrial robot. In addition, the assemblies of skin pieces are such that partial overlaps provide structural rigidity and the fact that these overlaps do not exceed a predefined percentage of the surface area per skin piece allows good transparency to electromagnetic waves to be guaranteed. This electromagnetic transparency is particularly advantageous when one or more electromagnetic beams from a radar or antennas positioned inside or at the rear of the radome pass through the radome in an area referred to as the "radiofrequency zone."

The radome according to the invention may likewise include the following characteristics, considered alone or in combination:
- The threshold value of the ratio is 30%.
- The first and second assemblies each reproduce a predetermined assembly pattern.
- Each skin piece has a rectangular, trapezoidal or triangular shape.
- The largest dimension of each skin piece is smaller than one-third of the largest overall dimension of the radome, preferably smaller than 42 cm (approximately the length of an A3 format), and even more preferably smaller than 30 cm (approximately the length of an A4 format).
- A skin layer comprises skin pieces arranged side-by-side to form at least one circular crown assembled on a rear portion of the radome and skin pieces arranged side-by-side forming parallel alignments of skin pieces in a front portion of the radome.
- The skin pieces are made of a composite material comprising a fabric reinforcement made of fibers such as flax, hemp, plain polyethylene or polyethylene with a very high molecular weight, glass fabric, quartz fabric, aramid fabric, the fabric being pre-impregnated with a thermosetting or thermoplastic organic or synthetic resin.
- The radome shell is made of foam, paper or resin, and has a cellular structure.

The invention also relates to a method for assembling an aircraft radome comprising at least one assembly of a first skin and a second skin on two opposite faces of the same shell, respectively, the first skin and the second skin being formed from a first assembly of skin pieces and from a second assembly of skin pieces, respectively. The method is characterized in that:
- all or some of the skin pieces of the first and second assemblies partially overlap one or more neighboring skin pieces of the assembly that includes them, and
- the ratio between the surface area of a piece of skin overlapping one or more neighboring pieces of skin and the total surface area of that piece of skin does not exceed a predetermined threshold value, the threshold value preferably being equal to 30%.

The invention also relates to an aircraft comprising a radome such as the one described above.

BRIEF DESCRIPTION OF THE DRAWINGS

The characteristics of the invention mentioned above, as well as others, will become more apparent from reading the following description of an exemplary embodiment, the description being provided in relation to the accompanying drawings, in which.

DETAILED DESCRIPTION OF THE PREFERRED EMBODIMENTS

Figure 1:
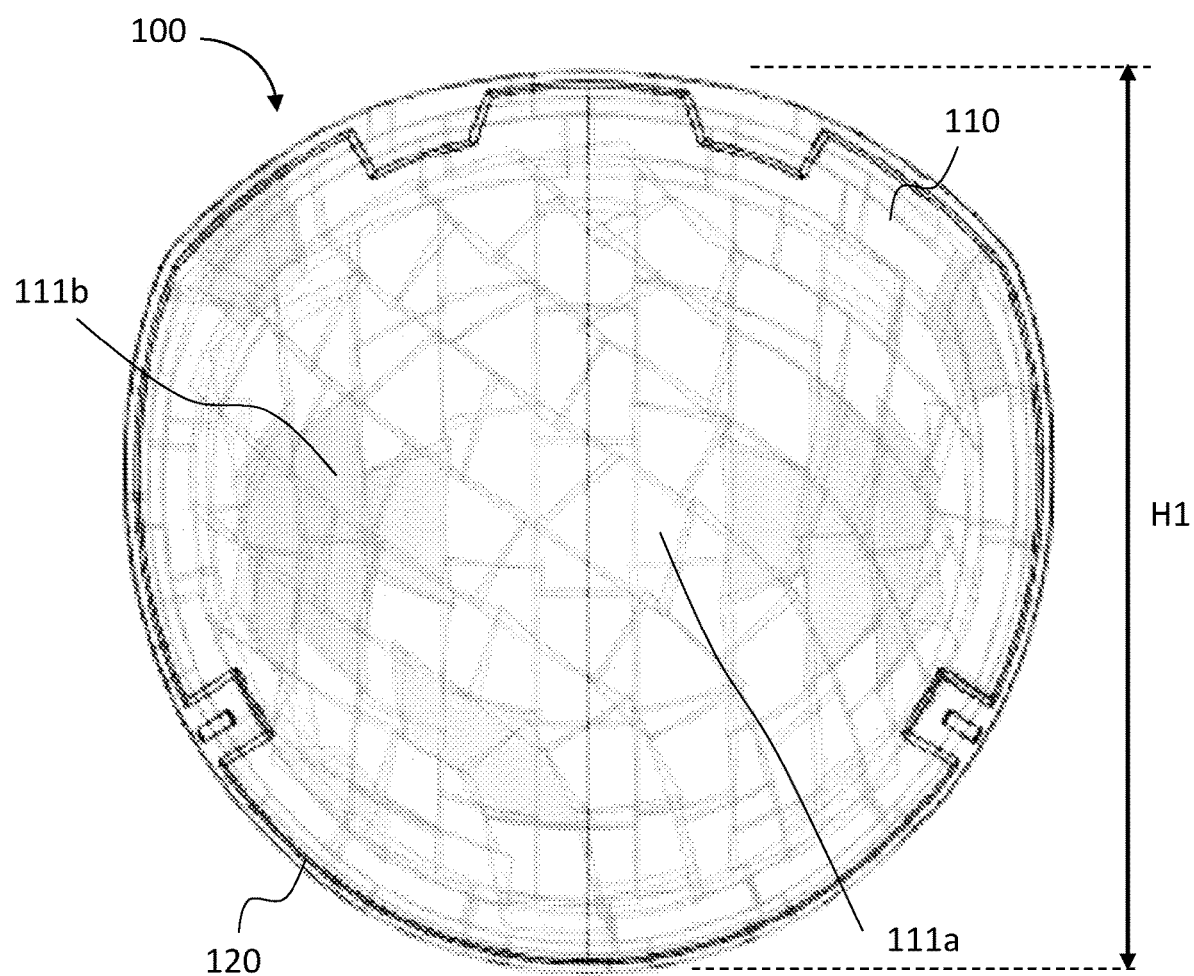
FIG. 1 is a schematic front-view representation of an aircraft radome according to one embodiment.

FIG. 1 is a schematic representation illustrating an aircraft radome 100 assembled according to one embodiment, seen from the front. The radome exhibits a generally pointed shell shape, forming a dome which is intended to be attached to the front of an aircraft fuselage. The front of the aircraft radome 100 is defined here as the tip of the radome (or the top of the dome), and therefore as the part furthest away from the fuselage members of the aircraft to which the radome is attached. Conversely, the rear of the radome is defined as the part closest to the fuselage members of the aircraft to which the radome is attached. According to one embodiment, the radome comprises an assembly of two skins 110 and 130 on a shell 120. According to variants, the aircraft radome 100 may include several shells which are similar to shell 120, each of the inner and outer faces of these shells then being overlapped by at least one assembly of skin pieces. An assembly of this kind constitutes a layer of skin pieces, also commonly referred to as "skin thickness," "skin ply," or "ply". Hence, according to variants, the aircraft radome 100 may comprise alternate shells 120 and skin plies, each surface of each shell 120 being covered with at least one skin ply alternating with two shells of a pair of neighboring shells 120 being separated by at least one skin ply.

According to the example described in connection with FIG. 1, a first skin 110 constitutes an outer skin of the radome 100 and a second skin 130, not referenced in FIG. 1 but referenced in FIG. 2, constitutes an inner skin of the radome 100. The outer skin 110 of the radome 100 is composed of a plurality of skin pieces 111a and 111b, also referred to as patches, which are assembled according to a predefined assembly pattern. In this case, the term "assembly pattern" refers to a positioning combination of each of the skin pieces of the outer skin 110 or of the inner skin 130.

According to one embodiment, the skin pieces 111a exhibit a rectangular shape and the skin pieces 111b exhibit a trapezoidal shape, these examples being non-limiting, and skin pieces may exhibit a different shape, for example a triangular shape. Only one of the skin pieces 111a and one of the skin pieces 111b are referenced in FIG. 1, in order to preserve the clarity and readability of this figure.

Advantageously and ingeniously, all or some of the skin pieces of the first and of the second assemblies partially overlap one or more neighboring skin pieces of the assembly that includes them, such that structural rigidity is obtained and therefore a good capacity for transmitting forces between two neighboring skin pieces.

Also advantageously and ingeniously, the ratio between the surface area of a piece of skin overlapping one or more neighboring skin pieces and the total surface area of that piece of skin does not exceed a predetermined threshold value, such as, for example, a value with a ratio of 30%.

Moreover, each of the skin pieces 111a and 111b has an overall dimension that is smaller than a predetermined length based on the overall size of the radome 100, so that a skin piece is substantially smaller in size compared with the size of the radome 100 and the positioning of a skin piece is made easier in view of the double curvature of the radome.

For example, it may be defined that the maximum dimension of a skin piece, such as its length when the skin piece has a rectangular shape, for example, is substantially smaller than half of the largest overall dimension of the radome 100. According to the example described in FIG. 1, the largest overall dimension of the aircraft radome 100 is the height H1 at the rear of the radome 100. It is therefore possible to manipulate and position a skin piece easily, in particular with the help of an automated device such as an industrial assembly robot.

According to another exemplary embodiment, each of the skin pieces used for assembling the radome has a rectangular shape with an A3 format or a trapezoidal or triangular shape with dimensions that fit within a rectangular template with an A3 format.

According to another exemplary embodiment, each of the skin pieces used for assembling the radome has a rectangular shape with an A4 format or a trapezoidal or triangular shape with dimensions that fit within a rectangular template with an A4 format.

In yet another embodiment, each of the skin pieces used for assembling the radome has a rectangular shape with an A5 format or a trapezoidal or triangular shape with dimensions that fit within a rectangular template with an A5 format.

According to an exemplary assembly pattern, rectangular skin pieces 111a are assembled end-to-end to form one or more circular crowns of the outer skin 110 of the radome 100, starting from the rear of the radome. Then, rectangular skin pieces 111a are assembled to form lines which are parallel to one another in the central portion of the remaining surface of the outer skin 110 of the radome 100, and trapezoidal skin pieces 111b are assembled in the remaining surface portion to cover the total surface of the radome between the aforementioned circular crowns and parallel lines. This advantageously allows for better control of the dimensions of overlapping areas between neighboring skin pieces, one from the other.

According to one embodiment, each of the inner skin 110 and outer skin 130 may comprise multiple layers (also referred to as plies) of skin pieces, each having different assembly patterns. Preferably, the overlapping areas between the skin pieces are evenly distributed over the surface of the radome, so that the electromagnetic transparency is homogeneous or evenly distributed.

For example, one layer of skin may comprise skin pieces arranged to form vertical parallel lines in the central area of the radome, and two other layers may comprise skin pieces arranged to form lines oriented at +60° and −60°, respectively, in the same area of the radome relative to the orientation of the lines in the first layer.

Similarly, one layer of skin may comprise pieces of skin arranged to form parallel lines in the central area of the radome, and another layer may comprise pieces of skin arranged to form crossed lines oriented at +/−90° relative to the orientation of the lines in the first layer. According to one embodiment, a reference for positioning the skin pieces is defined as being an intersection line between a vertical plane passing through the tip of the radome 100.

It should be noted that FIG. 1 illustrates a superposition of two assemblies of outer skin pieces 110, or in other words, two layers of skin pieces 111a and 111b assembled according to two different patterns, thanks to a transparency effect.

According to one embodiment, the outer skin 110 is made up of three layers of skin pieces 111a and 111b exhibiting different assembly patterns, and the inner skin 130 is made up of two layers of skin pieces 131a and 131b exhibiting different assembly patterns.

Advantageously, when multiple layers (or plies) of skin pieces are superposed to form a skin, the assembly of this skin is performed in such a manner that the overlapping areas in one thickness of skin pieces do not superpose overlapping areas in another thickness, so as to optimize the electromagnetic permeability of the radome 100. The electromagnetic permeability of the radome 100 depends on several factors, the thickness of the radome skins being one.

Figure 2:
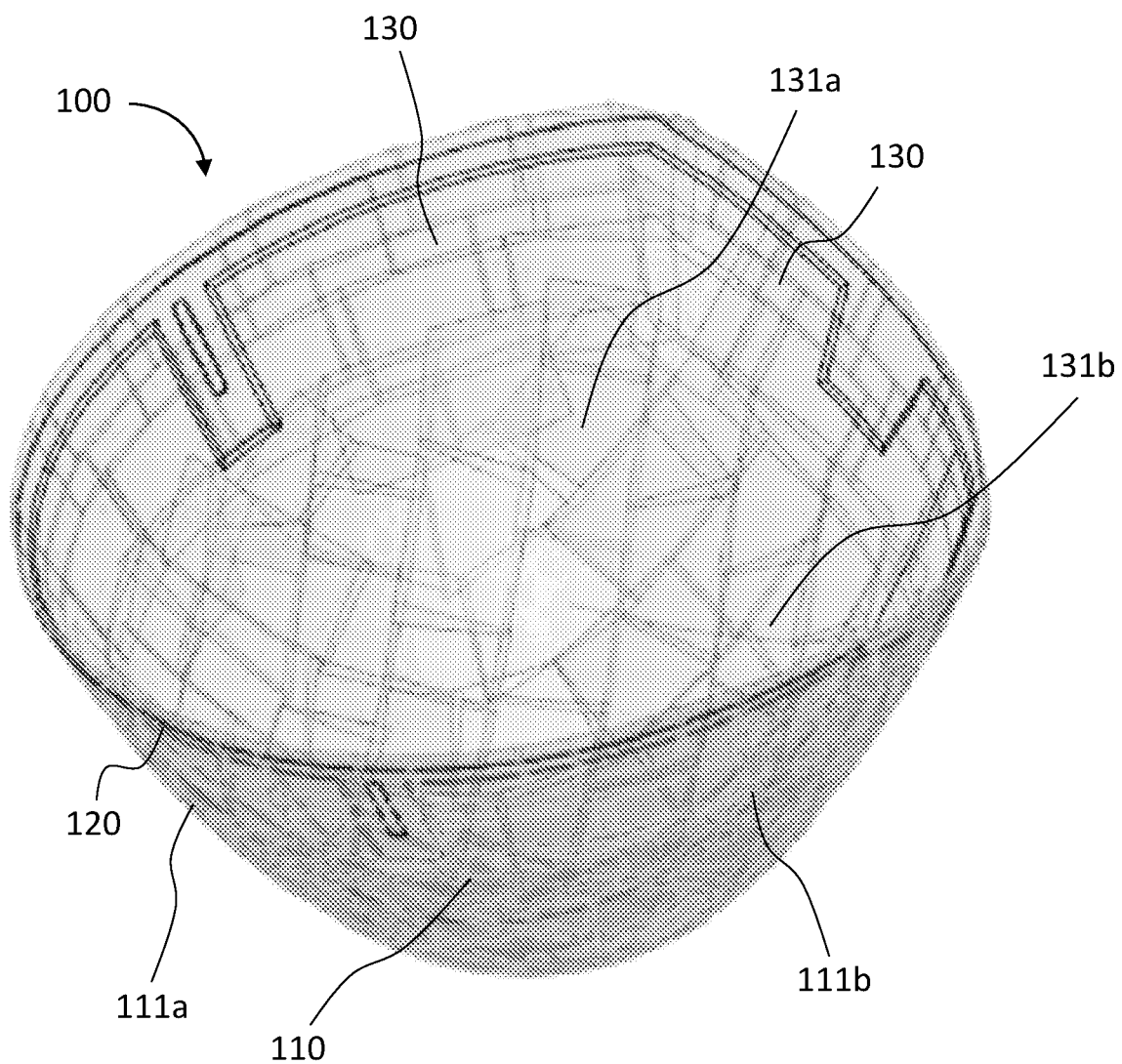
FIG. 2 is a schematic perspective-view representation of the aircraft radome already depicted in FIG. 1.

FIG. 2 is a schematic representation illustrating the assembled aircraft radome 100 according to one embodiment, viewed in perspective. The perspective view shown makes it possible to visualize an assembly of skin pieces 131a and 131b to form the inner skin 130 on the shell 120 and the assembly of skin pieces 111a, 111b to form the inner skin 110 on the shell 120. According to one embodiment, the skin pieces 131a have a rectangular shape and the skin pieces 131b have a trapezoidal shape. According to one embodiment, the assembly patterns of the skin pieces 110 are different from the assembly patterns of the skin pieces 130. Advantageously, the patterns are defined so as to meet the requirements of absorbing the stresses applied to the radome, for example through computer simulations or testing devices, by reproducing representative stresses from flight or impacts with external objects.

Figure 3:
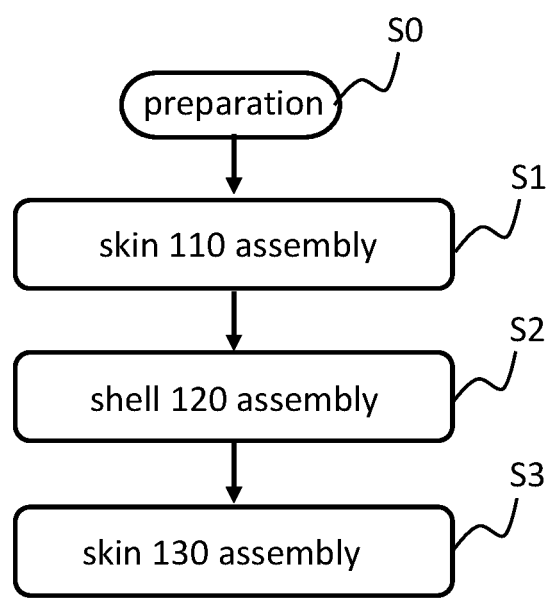
FIG. 3 is a diagram illustrating the steps involved in an aircraft radome assembly method already depicted in FIGS. 1 and 2, according to one embodiment.

FIG. 3 illustrates a method of assembling the aircraft radome 100 according to one embodiment. Step S0 is a preparation step for the manufacture of the radome 100, at the end of which a concave mold with a shape that matches the outer shape of the radome 100 and virtually matches the shape of the shell 120 is positioned in a manufacturing workshop.

Then, in step S1, an assembly of the first outer skin 110 is performed by positioning the skin pieces 111a and 111b in one or more layers, according to a predefined assembly pattern for the outer skin 110. The shell 120 is then positioned and fixed in step S2 against the outer skin 110 applied to the mold. In step S3, an assembly of the second inner skin 130 is performed by positioning the skin pieces 131a and 131b on the shell 120. Advantageously, the largest dimension of each of the pieces of skin used in steps S1 and S3 is smaller than a predetermined length equal to one-third of the largest overall dimension H1 of the radome 100. This allows for very easy positioning and enables the radome 100 to be assembled both manually and with the help of one or more programmed industrial robots for positioning according to predefined assembly patterns. Preferably, the skin pieces each have a rectangular, trapezoidal or triangular shape with dimensions that fit within a template with an A3, A4 or A5 format, as the smaller the skin pieces, the easier it is for their assembly as skin thickness(es) to be automated.

According to another embodiment, the shell 120 is held on a support during the manufacture of the radome 100 and the assemblies of the inner skin pieces 130 and outer skin pieces 110 are performed straight onto the shell 120.

Figure 4:
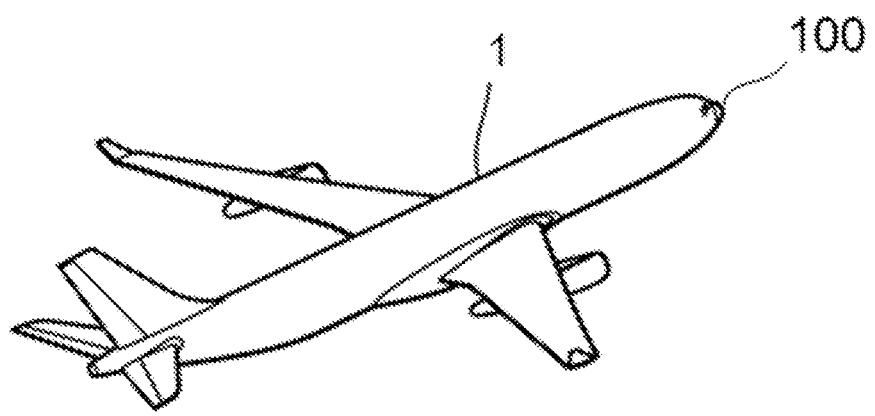
FIG. 4 illustrates an aircraft comprising an aircraft radome according to one embodiment.

FIG. 4 represents an aircraft 1 comprising a radome 100 according to an embodiment. Advantageously, the ability to automate the assembly of the radome 100 of the aircraft 1, due to the method which has been described, makes it possible to achieve a substantial gain in terms of productivity. Moreover, the use of smaller-sized skin pieces allows for cutting from strips of material with a smaller, fixed width, which substantially limits material waste and optimizes production costs.

The invention is not limited only to the embodiments and examples referred to, but more broadly encompasses any method of manufacturing an aircraft radome comprising at least one first assembly of skin pieces to assemble an outer skin on a first surface of a radome shell and a second assembly of skin pieces to assemble an inner skin on a second surface of the same shell, opposite the first surface, with some or all of the skin pieces in the first and second assemblies partially overlapping one or more neighboring skin pieces in the assembly that includes them, and such that the ratio between the surface of a skin piece overlapping one or more neighboring skin pieces and the total surface of that skin piece does not exceed a predetermined threshold value, for example 30%. Hence, according to variants, a radome may comprise more than three layers of skin pieces on the outer surface of a shell and more than two layers of skin pieces on the inner surface of the same shell. Furthermore, the skin pieces may have smaller dimensions than those described earlier. Therefore, according to one variant, a skin piece may have dimensions smaller than those described, for example fitting within a format smaller than A5.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft radome comprising:
   at least one shell,
   a first skin, and
   a second skin,
      said first skin and said second skin being assembled on two opposite faces of each of the at least one shell,
      said first skin and said second skin being formed from a first assembly of skin pieces and from a second assembly of skin pieces,
   wherein all or some of the skin pieces of said first and second assemblies partially overlap one or more neighboring skin pieces of the assembly that includes them, wherein a ratio between a surface area of a piece of skin overlapping one or more neighboring pieces of skin and a total surface area of that piece of skin does not exceed 30%, and wherein one of said first skin and said second skin comprises:

a front portion which includes a tip of the radome with skin pieces arranged to form a central skin layer which forms parallel lines in a central area of the radome, such that the parallel lines are parallel to, and spaced apart from, a plane which passes through the tip of the radome.

2. The aircraft radome according to claim 1, wherein said first and second assemblies each reproduce a predetermined assembly pattern.

3. The aircraft radome according to claim 1, wherein each of the skin pieces has a rectangular, trapezoidal or triangular shape.

4. The aircraft radome according to claim 1, wherein a largest dimension of each skin piece is smaller than one-third of a largest overall dimension of the radome.

5. The aircraft radome according to claim 4, wherein the largest dimension of each skin piece is smaller than 42 cm.

6. The aircraft radome according to claim 5, wherein the largest dimension of each skin piece is smaller than 30 cm.

7. The aircraft radome according to claim 1, wherein said one of said first skin and said second skin further comprises a rear portion which includes skin pieces arranged side-by-side to form at least one circular crown assembled at a bottom end of the front portion of the skin layer.

8. The aircraft radome according to claim 1, wherein the skin pieces are made of a composite material comprising a fabric reinforcement made of fibers, said fabric being pre-impregnated with a thermosetting or thermoplastic organic or synthetic resin.

9. The aircraft radome according to claim 8, wherein said fibers comprise flax, hemp, plain polyethylene or polyethylene with a very high molecular weight, glass fabric, quartz fabric, or aramid fabric.

10. The aircraft radome according to claim 1, wherein the shell is made of foam, paper or resin, and has a cellular structure.

11. An aircraft comprising an aircraft radome according to claim 1.

12. The aircraft radome according to claim 1, wherein the front portion further comprises two outer skin layers on opposite sides of the central skin layer which have skin pieces arranged to form lines oriented at a 60° angle relative to the parallel lines.

13. The aircraft radome according to claim 12, wherein the central skin layer comprises skin pieces with a rectangular shape, such that a long edge of the rectangularly shaped skin pieces is parallel to the parallel lines, and wherein the two outer skin layers comprise skin pieces with a trapezoidal shape.

14. A method for assembling an aircraft radome comprising an assembly of a first skin and of a second skin on two opposite faces of the same shell, respectively, said first skin and said second skin being formed from a first assembly of skin pieces and a second assembly of skin pieces, respectively, the method comprising the steps:

partially overlapping all or some of the skin pieces of said first and second assemblies with one or more neighboring skin pieces of the assembly that includes them, and maintaining a ratio between a surface area of a piece of skin overlapping one or more neighboring pieces of skin and a total surface area of that piece of skin below a predetermined threshold value, wherein one of said first skin and said second skin comprises:

a front portion which includes a tip of the radome with skin pieces arranged to form a central skin layer which forms parallel lines in a central area of the radome, such that the parallel lines are parallel to, and spaced apart from, a plane which passes through the tip of the radome.

15. The method according to claim 14, wherein the predetermined threshold value comprises 30%.

16. The method according to claim 14, wherein the front portion further comprises two outer skin layers on opposite sides of the central skin layer which have skin pieces arranged to form lines oriented at a 60° angle relative to the parallel lines.

17. The method according to claim 16, wherein the central skin layer comprises skin pieces with a rectangular shape, such that a long edge of the rectangularly shaped skin pieces is parallel to the parallel lines, and wherein the two outer skin layers comprise skin pieces with a trapezoidal shape.

* * * * *